US011141939B2

(12) United States Patent
Moffitt et al.

(10) Patent No.: US 11,141,939 B2
(45) Date of Patent: Oct. 12, 2021

(54) REPAIR OF REFILLABLE OR REUSABLE POLYMER-BASED PACKAGING

(71) Applicant: The Coca-Cola Company, Atlanta, GA (US)

(72) Inventors: Ronald D. Moffitt, Spartanburg, SC (US); Yu Shi, Marietta, GA (US); Xiaoyan Huang, Marietta, GA (US)

(73) Assignee: THE COCA-COLA COMPANY, Atlanta, GA (US)

(*) Notice: Subject to any disclaimer, the term of this patent is extended or adjusted under 35 U.S.C. 154(b) by 1287 days.

(21) Appl. No.: 14/466,487

(22) Filed: Aug. 22, 2014

(65) Prior Publication Data
US 2015/0054203 A1 Feb. 26, 2015

Related U.S. Application Data

(60) Provisional application No. 61/868,743, filed on Aug. 22, 2013.

(51) Int. Cl.
| | |
|---|---|
| *B29C 73/34* | (2006.01) |
| *B29C 35/16* | (2006.01) |
| *B29C 59/14* | (2006.01) |
| *B29C 73/26* | (2006.01) |
| *B29C 59/10* | (2006.01) |
| *B29C 35/08* | (2006.01) |
| *B29C 59/08* | (2006.01) |
| *B29C 35/04* | (2006.01) |
| *B29K 23/00* | (2006.01) |
| *B29K 67/00* | (2006.01) |
| *B29K 69/00* | (2006.01) |
| *B29K 105/00* | (2006.01) |
| *B29L 31/00* | (2006.01) |

(52) U.S. Cl.
CPC .............. *B29C 73/34* (2013.01); *B29C 35/16* (2013.01); *B29C 35/045* (2013.01); *B29C 59/085* (2013.01); *B29C 59/103* (2013.01); *B29C 59/142* (2013.01); *B29C 2035/0811* (2013.01); *B29C 2035/0822* (2013.01); *B29C 2035/0827* (2013.01); *B29C 2035/0838* (2013.01); *B29C 2035/1625* (2013.01); *B29C 2035/1633* (2013.01); *B29C 2035/1658* (2013.01); *B29C 2035/1683* (2013.01); *B29C 2073/262* (2013.01); *B29K 2023/08* (2013.01); *B29K 2023/12* (2013.01); *B29K 2067/003* (2013.01); *B29K 2069/00* (2013.01); *B29K 2105/0085* (2013.01); *B29K 2105/25* (2013.01); *B29L 2031/712* (2013.01); *B29L 2031/7158* (2013.01)

(58) Field of Classification Search
CPC .......... B29C 2073/262; B29C 73/34

USPC ................ 264/36.22, 36.1, 35.15
See application file for complete search history.

(56) References Cited

U.S. PATENT DOCUMENTS

| | | | |
|---|---|---|---|
| 4,522,770 A * | 6/1985 | Andersen | B29C 71/02 264/230 |
| 5,900,443 A | 5/1999 | Stinnett et al. | |
| 6,099,388 A | 8/2000 | Fritsch et al. | |
| 6,778,156 B2 | 8/2004 | Lee et al. | |
| 6,875,396 B1 | 4/2005 | Limanjaya | |
| 6,960,122 B2 | 11/2005 | Lin | |
| 8,784,149 B2 | 7/2014 | Sbar et al. | |
| 2002/0000983 A1 | 1/2002 | Lee et al. | |
| 2003/0002008 A1 | 1/2003 | Inoue et al. | |
| 2005/0208210 A1 | 9/2005 | Kuta | |
| 2009/0278271 A1 * | 11/2009 | Wolfe | B29C 73/26 264/36.22 |
| 2011/0207328 A1 * | 8/2011 | Speakman | H01L 51/0011 438/694 |
| 2011/0249187 A1 | 10/2011 | Weston | |
| 2011/0250352 A1 | 10/2011 | Petetti et al. | |
| 2011/0275282 A1 | 11/2011 | Popov et al. | |
| 2012/0180526 A1 | 7/2012 | Cormont et al. | |
| 2012/0269964 A1 | 10/2012 | Ito et al. | |
| 2012/0309273 A1 | 12/2012 | Popov | |

FOREIGN PATENT DOCUMENTS

| | | | | |
|---|---|---|---|---|
| DE | 10010831 A1 | | 9/2001 | |
| DE | 10139605 | * | 3/2003 | ............... B08B 9/22 |
| DE | 10139605 A1 | | 3/2003 | |
| EP | 0156516 A2 | | 10/1985 | |
| EP | 0192075 A2 | | 8/1986 | |
| EP | 0287216 A1 | | 10/1988 | |
| JP | S60193631 A | | 10/1985 | |

OTHER PUBLICATIONS

First Office Action issued in Chilean Application No. 00390-2016 (9 pages).
European Office Action of Application No. 14 766 270.4-1019, dated Jul. 22, 2019.

* cited by examiner

*Primary Examiner* — Jeffrey M Wollschlager
*Assistant Examiner* — Xue H Liu
(74) *Attorney, Agent, or Firm* — Eversheds Sutherland (US) LLP

(57) ABSTRACT

This disclosure provides economical and effective methods and apparatus for repairing scratches and scuffs on refillable bottle surfaces that minimally contaminates the bottle during the refurbishing process. In one aspect, the method comprises the steps of: a) adding at least one fluid into the polymeric packaging material such as a bottle to form at least a partially filled packaging material; and b) applying at least one heat source to an exterior surface of the at least partially filled packaging material to form a repaired polymeric packaging material. Apparatus and recycling systems that incorporate this method are also disclosed.

17 Claims, No Drawings

REPAIR OF REFILLABLE OR REUSABLE POLYMER-BASED PACKAGING

CROSS REFERENCE TO RELATED APPLICATIONS

This application claims the benefit of U.S. Provisional Patent Application No. 61/868,743, filed Aug. 22, 2013, which is incorporated by reference herein in its entirety.

FIELD OF THE DISCLOSURE

The present disclosure is generally related to polymer-based packaging, such as refillable and reusable packaging, and methods for repair of said packaging.

BACKGROUND OF THE DISCLOSURE

Reusable packaging represents an efficient use of packaging materials and a viable means of source reduction. The economic viability of reusable packaging is based in large measure upon the amortization of the initial packaging investment over the average number of return trips, although additional costs associated with the logistical requirements of a reusable packaging system such as cleaning, reconstitution, and assessment of fitness for reuse may be significant and should be considered in the overall cost and profitability equations.

For example, a refillable poly(ethylene terephthalate) (PET) carbonated beverage bottle may exceed 25 return trips during its useful life cycle. However, for refillable PET bottles, damage to the bottles incurred while in circulation within the float accumulates with each return cycle. Consequently, accumulated damage and exposure to and absorption of hazardous chemicals combine to limit the useful life cycle of the refillable bottle. Visual appearance and chemical detection techniques are often employed to determine bottle lifetime. An examination of bottling plant data related to bottle quality reject data indicates that surface abrasion and scuffing account for 50% or more of rejected bottles.

Therefore, an economical and effective means of repairing scratches and scuffs on refillable bottle surfaces that (1) is environmentally friendly, (2) minimally contaminates the bottle during the cleaning process, and (3) adds more return cycles to the life of the bottle and that may significantly advance the technological, economic, and environmental impact of refillable bottles in the marketplace.

SUMMARY OF THE DISCLOSURE

In accordance with this disclosure there are provided methods and apparatus for repairing scratches and scuffs on refillable container and bottle surfaces. These methods that can form the principle of operation for an apparatus are particularly useful for beverage containers and bottles, because the methods minimally contaminate the bottle during the refurbishing process.

In one aspect, for example, the method for repairing a polymeric packaging material such as a bottle or container can comprise the steps of:
  a) providing a polymeric packaging material, an exterior surface of which is scratched or scuffed;
  b) adding at least one fluid into the polymeric packaging material to form a filled packaging material, wherein the filled packaging material is at least partially filled with the fluid; and
  c) applying at least one heat source to an exterior surface of the filled packaging material to form a repaired polymeric packaging material.

According to a further aspect of this disclosure, there is provided a method for repairing a polymeric packaging material such as a bottle or container can comprise the steps of:
  a) providing a polymeric packaging material, an exterior surface of which is scratched or scuffed;
  b) abrading the exterior surface of the polymeric packaging material;
  c) before or after the abrading step, adding at least one fluid into the polymeric packaging material to form a filled packaging material, wherein the filled packaging material is at least partially filled with the fluid; and
  d) applying at least one heat source to an exterior surface of the filled packaging material to form a repaired polymeric packaging material.

Still a further aspect of this disclosure provides a method for repairing a polymeric packaging material such as a bottle or container can comprise the steps of:
  a) providing a polymeric packaging material, an exterior surface of which is scratched or scuffed; and
  b) applying at least one heat source to an exterior surface of the filled packaging material to form a repaired polymeric packaging material.

Another aspect of this disclosure provides a method for repairing a polymeric packaging material such as a bottle or container can comprise the steps of:
  a) providing a polymeric packaging material, an exterior surface of which is scratched or scuffed;
  b) abrading the exterior surface of the polymeric packaging material; and
  c) applying at least one heat source to an exterior surface of the filled packaging material to form a repaired polymeric packaging material.

Yet a further aspect of this disclosure provides a method for repairing a polymeric packaging material such as a bottle or container can comprise the steps of:
  a) providing a polymeric packaging material, an exterior surface of which is scratched or scuffed; and
  b) abrading the exterior surface of the polymeric packaging material to form a repaired polymeric packaging material.

The disclosed method is applicable to any kind of polymeric packaging material such as a thermoplastic, but is particularly useful for packaging materials comprising polyethylene terephthalate (PET), poly(ethylene-co-furandicarboxylic acid) (PEF), polypropylene (PP), or polycarbonate (PC), including combinations thereof. Moreover, when the repair method comprising heating, any kind of heating source can be used. For example, the heat source can comprise a flame, a flame torch, convected hot air, a plasma arc, electromagnetic induction, infrared radiation, a laser, a maser, a short-pulse high intensity UV flash lamp, a hot tool, or combinations thereof, wherein the heat source is applied continuously or pulsed. Particularly useful are a Q-switched Nd:YAG laser or a UV (ultraviolet) excimer laser.

Any or any combination of these methods can be used in the various aspects and embodiments of this disclosure. Particularly useful aspects include the following: a) a packaging material that is fluid filled or partially filled, and the exterior surface is abraded and heat treated; b) a packaging material that is fluid filled or partially filled, and the exterior surface is heat treated without abrasion; c) a packaging material that is not fluid filled or partially filled, and the exterior is surface abraded and heat treated; d) a packaging material that is not fluid filled or partially filled, and the exterior surface is heat treated without abrasion; and e) any of the above aspects or embodiments, in which local heating is followed by cooling upon applying (e.g. spraying) a fluid to the exterior of the packaging material.

In accordance with another aspect, there is provided an apparatus for recycling a polymeric packaging material comprising:
   a) at least one fluid source for providing at least one fluid for dispensing into the polymeric packaging material to form a filled packaging material;
   b) at least one heat source configured to heat an exterior surface of the filled packaging material.

In still another aspect, there is provided an apparatus for recycling a polymeric packaging material comprising:
   a) an abrasive component for contacting an exterior surface of the polymeric packaging material with an abrasive material;
   b) at least one fluid source for providing at least one fluid for dispensing into the polymeric packaging material to form a filled packaging material;
   c) at least one heat source configured to heat an exterior surface of the filled packaging material.

Yet other aspects of this disclosure provide an apparatus for recycling a polymeric packaging material comprising at least one heat source configured to heat an exterior surface of the filled packaging material.

Still other aspects of this disclosure provide an apparatus for recycling a polymeric packaging material comprising:
   a) an abrasive component for contacting an exterior surface of the polymeric packaging material with an abrasive material; and
   b) at least one heat source configured to heat an exterior surface of the filled packaging material.

The apparatus for recycling a polymeric packaging material as disclosed herein, can comprise one or both of an abrasive component and/or a heat source for refurbishing the exterior surface of the polymeric packaging material, and further include at least one fluid source for providing at least one fluid for dispensing into the polymeric packaging material to form a filled packaging material, for applying the fluid to the exterior of the polymeric packaging material, or both.

Further aspects of this disclosure provide for an apparatus for recycling a polymeric packaging material comprising an abrasive component for contacting an exterior surface of the polymeric packaging material with an abrasive material.

These and various other aspects and embodiments of this disclosure are illustrated in the detailed description and examples that follow.

DETAILED DESCRIPTION OF THE DISCLOSURE

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that the following detailed description is exemplary and explanatory only and is not restrictive.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, aspects, structures, or characteristics may be combined in any suitable manner in one or more embodiments.

In one aspect of the present disclosure, a method for repairing a polymeric packaging material is provided, wherein the "packaging material" includes for example a bottle, container, vessel, or receptacle that is made of, comprises, or includes primarily a polymer such as those disclosed herein. The method can include the step of adding at least one fluid into the polymeric packaging material to form a filled packaging material, wherein the filled packaging material is at least partially filled with the fluid. At least one heat source can next be applied to one or more exterior surfaces of the filled packaging material to form a repaired polymeric packaging material. Other terms used in this disclosure for polymeric packaging material include, for example, a polymer based package, bottle, container, or vessel; a polymeric package, bottle, container, or vessel, or that is made of, comprises, or includes primarily a polymer such as those disclosed herein.

In another aspect of the present disclosure, a recycling system for a polymeric packaging material is provided. The recycling system can include at least one fluid source configured to deliver at least one fluid into the polymeric packaging material to form a filled packaging material and at least one heat source configured to heat one or more surfaces of the filled packaging material.

In still another aspect of the present disclosure, an apparatus for recycling a polymeric packaging material is provided. The apparatus can include at least one fluid source for providing at least one fluid for dispensing into the polymeric packaging material to form a filled packaging material and at least one heat source configured to heat one or more surfaces of the filled packaging material.

Aspects of this disclosure describe a repair and reconstitution process for polymeric packaging materials, including those comprising a thermoplastic polymer construction ("thermoplastics"). The polymeric packaging material in the included examples below is a refillable PET bottle but this is not intended to limit the scope of this disclosure, since in other embodiments other suitable polymeric packaging materials may also be repaired. This disclosure relates not only to the process for the repair and reconstitution of polymeric packaging materials, but also to the repaired or reconstituted polymeric packaging materials, as detailed in one or more embodiments of the present disclosure.

Additional aspects of the disclosure pertain to the optional abrasion of one or more surface layers of a polymeric packaging substrate and heating the optionally abraded surface to induce softening, deformation, and/or melting of an exterior surface to level and reduce surface imperfections, for instance such that clarity and gloss are restored to the exterior surface. However, it should be noted, for the purposes of this disclosure, that bottle surface restoration and reconditioning may be accomplished by heat treatment alone, depending upon the extent of surface damage that the refillable bottle has incurred during time at market.

Properties of the exterior surfaces of a polymeric packaging material include, but are not limited to scratches, deep scratches, clarity, and gloss. The term "restore the surface properties" means transforming a used polymeric packaging material into a repaired polymeric packaging material, such that one or more of the properties of the restored exterior surface is in a condition such that the restored packaging material may be reused.

In some embodiments, the polymeric packaging materials may include one or more plastic resins such as high density polyethylene (HDPE), low density polyethylene (LDPE), linear low density polyethylene (LLDPE), polyethylene terephthalate (PET), poly(ethylene-co-furandicarboxylic acid) (PEF), polyvinyl chloride (PVC), polypropylene (PP), polystyrene (PS), polyamides (PA), acrylonitrile butadiene styrene (ABS), polycarbonate (PC), polyurethane (PU), melamine formaldehyde (MF), phenolics (PF), polyetherketones (PEEK), polylactic acids (PLA), polymethyl methacrylate (PMMA), polytetrafluoroethylene (PTFE), urea-formaldehyde (UF), post-consumer resins, bioplastics, and the like.

Generally, poly(ethylene-co-furandicarboxylic acid) (PEF) and polycarbonate (PC) bottles behave similarly to polyethylene terephthalate (PET) bottles in their surface refurbishment properties, and the representative methods and parameters that are useful for refurbishing PET can typically be used for repairing and refurbishing bottles containing any of these polymers. Polypropylene (PP) bottles however, while also capable of being repaired and refurbished according to this disclosure, may show some whitening due to crystallization during heating, particularly if the heating rates are slow relative to crystallization kinetics, for the following reasons. Therefore relatively fast heating processes such as pulsed laser heating described in detail below work very well with PP as well as the other polymers.

Heating

In one aspect, the bottles, packages, or containers of this disclosure can be refurbished by heating with abrasion, or alternatively, by heating without abrasion. Methods of heating for either heating method that may be suitable for this disclosure include but are not limited to flame treatment, hot air convection, plasma arc heating, infrared radiation heating, laser or maser assisted heating, high intensity UV flash lamp heating, hot tool conduction, and combinations thereof. In some embodiments, the at least one heat source may comprise a flame, a flame torch, convected hot air, a plasma arc, electromagnetic induction, infrared radiation, a laser such as a UV excimer laser, a maser, a short-pulse high intensity UV flash lamp, a hot tool, and combinations thereof.

In an embodiment, a method for repairing a polymeric packaging material is provided that generally includes the step of adding at least one fluid into the polymeric packaging material to form a filled packaging material. In other embodiments, a fluid is not added into the packaging material. The method may further include the subsequent step of applying heat, or heat treatment, using one or more heat sources and applying them to one or more exterior surfaces of the filled packaging material. In other embodiments, the method involves applying heat, from one or more heat sources, to one or more exterior surfaces of an unfilled packaging material.

As used herein, the term a "filled packaging material" means a polymeric packaging material that is at least partially filled with a fluid. In some embodiments, the fluid may be in a gaseous or a liquid form. As used herein, the term "unfilled packaging material" means a polymeric packaging material that is capable of being filled with an added fluid but that has not been filled with an added fluid.

In some embodiments, the at least one fluid is a liquid or a gas at or near ambient temperature and pressure, before and/or after filling the packaging material. In some embodiments, the at least one fluid is a liquid. In some embodiments, the at least one fluid is either warmer than or cooler than ambient temperature. In other embodiments, the fluid is any fluid sufficient to restore the surface of a polymeric packaging material, as measured following a subsequent heat treatment step. In other embodiments, the temperature of the one or more fluids in the polymeric packaging material is above, at, near, or below ambient temperature.

Suitable fluids may include, but are not limited to, water, alcohols and polyols, brines, mild acids, mild bases, mineral oils, vegetable oils, synthetic oils, petroleum jelly, liquid paraffin, solvents that do not degrade the polymeric packaging material, and the like. In other embodiments, the fluid is an inert gas such as nitrogen, helium, argon, and the like. In still other embodiments, the polymeric packaging material forms a closed system and may be charged with an inert gas, ambient air, and/or another gas. In some embodiments, the pressure of the closed system is above, at, near, or below ambient pressure. In some embodiments, the temperature of the one or more fluids in the closed system is above, at, near, or below ambient temperature.

There are various methods by which fluids can be used to control the heating process, for example, the packaging material can be fluid filled or partially fluid filled, and the exterior surface can be heat treated, abraded, or both. In further aspects, and with or without the packaging material being fluid filled or partially fluid filled, the exterior surface of the packaging material can be heat treated (or abraded, or both), in which local heating is followed by cooling upon applying for example by spraying a fluid to the exterior of the packaging material. In this aspect, the most common fluid is water. Particularly when empty bottles are being refurbished, the empty bottle shrinkage can be mitigated by the targeted local heating by laser, followed with cooling of spraying water. Due to the small heat affected zone (small thermal penetration depth) achieved with the laser, it is also possible to simply oscillate the bottle back and forth in a programmed trajectory covering the targeted surface area to be heat treated allowing for maximum cooling time between laser pulses for contiguous treatment areas, using a cycle time that allows for added cooling. Programmed robotics can therefore be used to control the area heating sequence and trajectory.

While not intending to be bound by theory, it has been discovered that the whitening or opacity that can occur during certain heat refurbishing processes can be circumvented by understanding crystallization rates compared to heating rates. Specifically, whitening or opacity can occur in relatively slow heating processes where crystallization is relatively fast compared to the heating time scale, when the polymer heated surface is at a temperature T within the thermal range for crystallization, $T_g < T < T_m^0$, where $T_g$ is the glass transition temperature and $T_m^0$ is the equilibrium melting temperature of the polymer. With fast pulsed laser heating, the heat-affected zone is confined to within nanometers to microns of the heated surface, and cooling times following the laser pulse are sufficiently rapid that significant re-crystallization is effectively subdued for slowly crystallizing polymers such as PET, PEF, and PC. If flame treatment of PET bottles, which is a slow heating process relative to pulsed laser heating, is performed without fluid filling (e.g. water), shrinkage and crystallization can occur. For PP however, which is a rapidly crystallizing polymer, heating processes that are slower than the crystallization rate typically will give rise to opacity due to the onset of crystallization.

In one aspect, and again while not bound by theory, the optical absorption coefficient for fast pulsed laser heating is wavelength dependent and varies for different polymeric materials. Polymers that contain pi-bonded heteroatoms generally have much higher optical absorption coefficients in the 240 nm to 170 nm wavelength range than those polymers that do not contain pi-bonded heteroatoms such as PP, PE (polyethylene) and PTFE. Therefore, in an aspect, this disclosure also provides that the pulsed laser surface heating and polishing of surfaces such as PP and PE can be carried out using a coating or incorporated UV-absorbing compound to elevate the effective optical absorption of the polymer matrix, sometimes by orders of magnitude, and thereby provide a much more efficient conversion of laser power to heat to achieve efficient surface melting. In this case, the surface or bulk addition of UV-absorbing compounds can help achieve better surface heating, melting, and flow to smooth and polish the packaging surface.

Laser Systems for Heating

According to one aspect, a fast, high energy pulse heat treatment such as provided by a Q-switched Nd:YAG laser can be used according to this disclosure for the heating step of refurbishment of a bottle. This type of pulsed laser system can be particularly useful when heating for repair and refurbishing PEF, PC, and PP bottles or containers, in which case, is it possible to achieve repair with no visible crystallization effects for these polymers. For example, for the group of polymers PP, PET, PEF, and PC, crystallization rate is ordered from fastest to slowest as PP>>PET>PEF>>PC. Thus, PEF crystallizes very little and PC crystallizes negligibly. Further, PP is the fastest crystallizing resin of this group, PEF crystallizes slower than PET, but much faster than PC, which has a negligible rate of crystallization. Therefore, a laser system as disclosed herein can be used in the heating step, with or without the abrasion step in the refurbishment process to repair bottles.

Fast pulsed lasers with a variable pulse width and energy can achieve melting and flow and to effectively level the scuffed or abraded surface of the bottle through the highly controlled and limited surface melting, while at the same time ensuring bottle transparency in an empty bottle. For example, Q-switched lasers which are commonly used to remove tattoos with little or no discomfort to the patient apply a high heat flux in rapid pulses to vaporize and remove tattoo pigments and skin in the affected area. Similarly, and while not intending to be bound by theory, any laser system that is useful generally for removing to any extent a tattoo can also be used in the method according to this disclosure. That is, reconditioning "refPET" (refurbished PET) bottles using such a Q-switched laser is a similar application where heating and melting a very thin surface layer of the bottle can be achieved, that is on the order of the size scale of the scratch or scuffing mark, that is, on the general scale of the depth of the mark, which allows the surface to level.

In accordance with a further aspect, a UV (ultraviolet) excimer laser can also be advantageously used to refurbish and repair bottles according to this disclosure, including use without the need for an abrasion step. An excimer laser (also called an exciplex laser) is a type of ultraviolet laser which has been used previously in producing microelectronics devices or for medical procedures. With a UV excimer laser system (or a short pulse, high intensity UV flash lamp array), empty scuffed PET bottles could be refurbished without the use of abrasives. In this case, the smooth surface layer is formed by irradiating the polymer with radiation that is strongly absorbed by the polymer, and when irradiated using sufficient intensity and fluence, the bottle is caused to acquire a smooth, glossy and polished surface.

One particularly useful method for refurbishing bottles according to this disclosure is with then use of UV (ultraviolet) excimer lasers. An "excimer" laser is an excited dimer laser where two normally non-reactive gases are exposed to an electrical discharge, which allows them form an excited compound. This compound releases a photon (laser output), drops to an unexcited state, and disassociates to the original gases. The excimer laser is very high efficiency in producing short wavelength (UV) light and short pulses widths, which make the excimer laser suitable for the process disclosed herein. For example, a KrF excimer laser has a UV radiation 248 nm wavelength, which is useful in this disclosure, as are excimer lasers of other wavelengths.

In one aspect, examples of UV excimer lasers and properties that are suitable for the refurbishing methods of this disclosure are illustrated in Table 1. In this table, both approximate minimum and maximum laser system parameters are provided, but we note that any number within these ranges, and any subranges within these minimum and maximum values are encompassed by this disclosure.

TABLE 1

UV Excimer Laser Information for Repair of PET and other Packaging Polymers

| UV Excimer Laser System Parameter | Minimum Value | Maximum Value | Units |
|---|---|---|---|
| Optical Absorption Coefficient[A] | ≥$10^5$ | — | $cm^{-1}$ |
| Laser Wavelength | 150 | 350 | nm |
| Laser Fluence (per pulse) | 3 | 300 | $mJ/cm^2$ |
| Laser Pulse Width | 10 | 1,000,000 | ns |
| Heat Affected Zone Average Temperature | $T_m$ | $T_m$ + 100° C. | ° C. |
| Heat Affected Zone Depth | 5 | 50,000 | nm |

[A]Some polymers for example PE and PP can benefit from surface or bulk addition of UV-absorbing compounds to increase the optical absorption coefficient at the surface and help achieve better surface heating, melting, and flow.

Regarding these UV excimer laser parameters that are suitable for the refurbishing methods of this disclosure, in one aspect, suitable laser wavelengths can be from about 150 to about 300 nm or any value or subrange therebetween. Alternatively, suitable laser wavelengths can be about 150 nm, about 160 nm, about 170 nm, about 180 nm, about 190 nm, about 200 nm, about 210 nm, about 220 nm, about 230 nm, about 240 nm, about 250 nm, about 260 nm, about 270 nm, about 280 nm, about 290 nm, about 300 nm, about 310 nm, about 320 nm, about 330 nm, about 340 nm, about 350 nm, or any value or subrange therebetween.

According to another aspect, suitable laser fluence can be from about 3 to about 30 $mJ/cm^2$ per pulse, or any value or subrange therebetween. Alternatively, suitable laser fluence (per pulse) can be about 3 $mJ/cm^2$, about 4 $mJ/cm^2$, about 5 $mJ/cm^2$, about 6 $mJ/cm^2$, about 7 $mJ/cm^2$, about 8 $mJ/cm^2$, about 9 $mJ/cm^2$, about 10 $mJ/cm^2$, about 12 $mJ/cm^2$, about 15 $mJ/cm^2$, about 20 $mJ/cm^2$, about 30 $mJ/cm^2$, about 40 $mJ/cm^2$, about 50 $mJ/cm^2$, about 60 $mJ/cm^2$, about 70 $mJ/cm^2$, about 80 $mJ/cm^2$, about 90 $mJ/cm^2$, about 100 $mJ/cm^2$, about 120 $mJ/cm^2$, about 140 $mJ/cm^2$, about 160 $mJ/cm^2$, about 180 $mJ/cm^2$, about 200 $mJ/cm^2$, about 220 $mJ/cm^2$, about 240 $mJ/cm^2$, about 260 $mJ/cm^2$, about 280 $mJ/cm^2$, or about 300 $mJ/cm^2$ (per pulse), or any value or subrange therebetween.

In yet another aspect, suitable laser pulse widths can be from about 10 ns to about 1,000,000 ns, or any value or subrange therebetween. Alternatively, suitable laser pulse widths can be about 10 ns, about 20 ns, about 50 ns, about 100 ns, about 200 ns, about 500 ns, about 1,000 ns, about 2,000 ns, about 5,000 ns, about 10,000 ns, about 20,000 ns, about 50,000 ns, about 100,000 ns, about 200,000 ns, about 500,000 ns, about 1,000,000 ns, or any value or subrange therebetween.

Still other aspects of this disclosure provide for a heat affected zone average temperature having a value from about $T_m$ to about $T_m+100°$ C., where $T_m$ is the peak melt temperature of the specific polymer, or any value or subrange therebetween. Alternatively, suitable heat affected zone average temperatures can be about $T_m$, about $T_m+10°$ C., about $T_m+20°$ C., about $T_m+30°$ C., about $T_m+40°$ C., about $T_m+50°$ C., about $T_m+60°$ C., about $T_m+70°$ C., about $T_m+80°$ C., about $T_m+90°$ C., about $T_m+100°$ C., or any value or subrange therebetween.

When used according to the present disclosure and in another aspect, the heat affected zone depth can be from about 5 nm to about 10,000 nm, or any value or subrange therebetween. Alternatively, the heat affected zone depth can be about 5 nm, about 10 nm, about 20 nm, about 50 nm, about 100 nm, about 200 nm, about 500 nm, about 1,000 nm, about 2,000 nm, about 5,000 nm, about 10,000 nm, about 15,000 nm, about 20,000 nm, about 25,000 nm, about 30,000 nm, about 35,000 nm, about 40,000 nm, about 45,000 nm, about 50,000 nm, or any value or subrange therebetween.

Therefore, these laser heating systems, like all the heating method disclosed herein, can be used to refurbish bottles, packages, or containers by heating in combination with abrasion (before, after, or during heating or in any combination), or alternatively, by heating without abrasion.

Mechanical Abrasion

In some embodiments, the method for repairing polymeric packaging material may also include the step of mechanically abrading one or more of the exterior surfaces of the polymeric packaging material. Abrasion, for the purposes of this disclosure, is as a controlled method or process of inducing surface wear to level scratches, cuts, and nicks in and on the exterior surfaces of the packaging material.

Suitable methods of abrading include, but are not limited to, sanding, stoning, particulate blasting, peening, filing, grinding, honing, abrasive belt machining, buffing, brushing, abrasive sawing, polishing, lapping, hydro-erosive grinding, water jet cutting, abrasive blasting, tumbling, and combinations thereof. In some embodiments, the one or more exterior surfaces of the polymeric packaging material are abraded to an extent sufficient to restore the surface properties of that exterior surface of the packaging material, as measured following a subsequent heat treatment step. In some embodiments, the step of abrading occurs before an optional step of adding a fluid into the packaging material and the step of applying a heat source to the at least partially filled packaging material.

In some embodiments, the step of abrading may be done using particulate blasting. Suitable methods of particulate blasting include but are not limited to web abrasive blasting, bead blasting, wheel blasting, hydro-blasting, micro-abrasive blasting, automated blasting, dry ice blasting, bristle blasting, and combinations thereof.

As used herein, the term "to an extent sufficient to restore the surface properties of that exterior surface of the packaging material" means repairing the packaging material such that the repaired packaging material has a life cycle that is extended by about 50 return cycles, about 30 return cycles, about 25 return cycles, about 20 return cycles, about 15 return cycles, about 10 return cycles, or about 5 return cycles. In other embodiments, a repaired packaging material has a life cycle that is extended by about 5 to about 50, about 10 to about 50, about 20 to about 50, about 15 to about 30, or about 15 to about 25 return cycles.

Abrasive materials may be used for the step of abrading the packaging material. In embodiments, the abrasive material may be a coated abrasive such as sand paper. Other suitable abrasives include, but are not limited to, aluminum oxide, silicon carbide, silicon dioxide, emery, pumice, steel abrasives, diamond, cubic boron nitride, and combinations thereof. According to an aspect, the abrasive material can have an abrasiveness of about 240 grit to about 1,800 grit, about 240 grit to about 1,500 grit, about 400 grit to about 1000 grit, or about 600 grit. In some other aspects, the abrasive material is an emery cloth, and the emery cloth can have an abrasiveness of about 240 grit to about 1000 grit, about 240 grit to about 800 grit, about 400 grit to about 800 grit, or about 600 grit. In certain aspects, the abrasive material can have an abrasiveness of about 240 grit, about 300 grit, about 400 grit, about 500 grit, about 600 grit, about 700 grit, about 800 grit, about 900 grit, about 1,000 grit, about 1,100 grit, about 1,200 grit, about 1,300 grit, about 1,400 grit, or about 1,500 grit.

Moreover, abrasives can be applied through the use of rotating belts, discs, liquid slurries, pastes, combinations thereof, and the like. In some aspects, it is beneficial to start abrasion with a low grit and progress to high grit abrasives to accomplish surface smoothing of the deeper scuffs and scratches, either alone or in combination with heat treatment.

Repaired Polymeric Packaging Material

As used herein, the term "repaired polymeric packaging material" is defined as modifying, restoring, and/or repairing a polymeric packaging material such that the quality of the visual appearance is improved relative to the quality of the visual appearance of a corresponding unrepaired polymeric packaging material and the repaired packaging material has an extended life cycle. In some embodiments, the quality of the visual appearance of a repaired polymeric packaging material is of sufficient quality to enable the repaired packaging material to be reused and thereby to have an extended life cycle. In certain embodiments, the unrepaired packaging material is not of sufficient quality for reuse and/or has undergone a predetermined number of return cycles, while the repaired packaging material is of sufficient quality for reuse and/or of sufficient quality for reuse and having a life cycle that is extended by a specified number of return cycles.

As used herein, the term "return cycles" means the number of times that a packaging material may be used by a consumer, recycled, and then reused. According to this disclosure, a packaging material is considered unrepaired at the point when the packaging material has undergone a certain number of return cycles and is no longer considered of sufficient quality for reuse. In some embodiments, a repaired packaging material has a life cycle that is extended by about 50 return cycles, about 30 return cycles, about 25 return cycles, about 20 return cycles, about 15 return cycles, about 10 return cycles, or about 5 return cycles. In other embodiments, a repaired packaging material has a life cycle that is extended by about 5 to about 50, about 10 to about 50, about 20 to about 50, about 15 to about 30, or about 15 to about 25 return cycles.

In another aspect, a recycling system for a polymeric packaging material is provided. The recycling system comprises at least one fluid source that is configured to deliver at least one fluid into the polymeric packaging material to form a filled packaging material. The system further comprises at least one heat source that is configured to heat one or more surfaces of the filled packaging material. In some embodiments, the recycling system further includes at least one abrasive component that is configured to abrade one or more surfaces of the polymeric packaging material.

In some embodiments, the abrasive component is a sand paper, a stone, a particulate, an abrasive cloth, a filing material, or combinations thereof. In certain embodiments, the abrasive component is configured to substantially uniformly abrade one or more surfaces of the polymeric packaging material.

In still other embodiments, the recycling system may include any one or more of the other features identified above in the method for repairing polymeric packaging materials.

In another aspect, an apparatus for recycling a polymeric packaging material is provided. The apparatus comprises at least one fluid source for providing at least one fluid for dispensing into the polymeric packaging material to form a filled packaging material. The apparatus further comprises at least one heat source that is configured to heat one or more surfaces of the filled packaging material.

In some embodiments, the apparatus for recycling further includes at least one abrasive component that is configured to abrade one or more surfaces of the polymeric packaging material. In certain embodiments, the abrasive component is configured to substantially uniformly abrade one or more surfaces of the polymeric packaging material.

In still other embodiments, the apparatus for recycling a polymeric packaging material may include any one or more of the other features identified above in the method for repairing polymeric packaging materials and the recycling system.

In another aspect, a method for restoring the surface of a packaging material is provided. In certain embodiments, the method for restoring comprises heating the surface of the packaging material. In some embodiments, the method for restoring comprises heating the surface such that the packaging material softens, deforms, and/or melts to subsequently provide a restored surface. In some embodiments, the method for restoring comprises heating the surface of the packaging material such that substantially no shrinkage is observed on the restored surface of the packaging material.

The present disclosure is further illustrated by the following examples, which are not to be construed in any way as imposing limitations upon the scope thereof. The examples are set forth to illustrate the disclosed subject matter and are not intended to be inclusive of all aspects of the subject matter disclosed herein, but rather to illustrate representative methods and results. These examples do not intended to exclude equivalents and variations of the present invention which are apparent to one skilled in the art.

EXAMPLES

Example 1

A 0.5 L PET bottle was rejected for excessive scuffing and was acquired for repair. The base of the bottle was manually abraded with a 600-grit emery cloth until a uniformly abraded surface was obtained and then prepared for heat treatment. A propane torch flame was applied to the abraded surface at a distance sufficient to accomplish a desirable amount of surface melting and smoothing while minimizing shrinkage of the bottle. The transparency and gloss of the bottle were reestablished, although this method resulted in a measureable amount of local shrinkage of the treated surface.

Example 2

A 0.5 L PET bottle that was rejected for excessive scuffing was acquired for repair. The base of the bottle was manually abraded with a 600-grit emery cloth until a uniformly abraded surface was prepared for heat treatment. Prior to heat treatment, however, the bottle was filled to the finish with cold tap water. "Cold" as used herein is any temperature below ambient temperature but above the freezing point of the fluid (water). A propane torch flame was applied to the abraded surface at a distance that accomplished surface melting while minimizing shrinkage of the bottle. The transparency and gloss of the bottle were reestablished and no measureable amount of local shrinkage occurred within the area treated.

Example 3

A 0.5 L PET bottle that was rejected for excessive scuffing was acquired for repair. The bottle was not treated with an abrasive. Prior to heat treatment, however, the bottle was filled to the finish with cold tap water. A propane torch flame was applied to the scuffed area at a distance that accomplished surface melting while minimizing shrinkage of the bottle. Bottle transparency and gloss were reestablished with the treatments and no measureable amount of local shrinkage occurred within the area treated. However, deep surface scratches were still apparent upon visual inspection of the treated bottle. Without being limited to a single conclusion, the controlled application of an abrasive prior to heat treatment was generally used to eliminate deep surface scratches when they were present.

Example 4

Poly(ethylene-co-furandicarboxylic acid) (PEF) and polycarbonate (PC) bottles behave similarly to polyethylene terephthalate (PET) bottles in their surface refurbishment properties, and any of the representative methods of Examples 1-3 can be employed for repairing and refurbishing these bottles. Polypropylene (PP) bottles also can be refurbished using the representative methods of Examples 1-3, however PP bottles may show some whitening due to crystallization during heating, particularly if the heating rates are slow relative to crystallization kinetics.

Example 5

Poly(ethylene-co-furandicarboxylic acid) (PEF), polycarbonate (PC), polyethylene terephthalate (PET), and polypropylene (PP) bottles can be surface repaired and refurbished using a Q-switched Nd:YAG laser. When PEF, PC, and PP bottles are heating for repair using such a pulsed laser, there are no visible crystallization effects. This laser heating method can be used with or without the abrasion step in the refurbishment process.

Example 6

A UV (ultraviolet) excimer laser can also be advantageously used to refurbish and repair bottles according to this disclosure, including bottles made of any of the disclosed polymers, with or without using an abrasion step. Generally, using the UV excimer laser system (or a short pulse, high intensity UV flash lamp array), empty scuffed PET bottles can be refurbished without the use of abrasives. In this case, the smooth surface layer is formed by irradiating the polymer with radiation that is strongly absorbed by the polymer, and when irradiated using sufficient intensity and fluence, the bottle is caused to acquire a smooth, glossy and polished surface. In this example, UV excimer lasers and properties that are suitable for the refurbishing methods of this disclosure are illustrated in Table 1.

Example 7

A plastic resin bottle comprising high density polyethylene (HDPE), low density polyethylene (LDPE), linear low density polyethylene (LLDPE), polyethylene terephthalate (PET), poly(ethylene-co-furandicarboxylic acid) (PEF), polyvinyl chloride (PVC), polypropylene (PP), polystyrene (PS), polyamides (PA), acrylonitrile butadiene styrene (ABS), polycarbonate (PC), polyurethane (PU), melamine formaldehyde (MF), phenolics (PF), polyetherketones (PEEK), polylactic acids (PLA), polymethyl methacrylate (PMMA), polytetrafluoroethylene (PTFE), urea-formaldehyde (UF), post-consumer resins, or bioplastics, that has excessive scuffing can be repaired according to any one of Examples 1-3, 5 or 6.

Example 8

A plastic resin bottle or container that has excessive scuffing having a volume from about 250 mL up to about 3 L, including bottles made of any of the polymers of Example 7, can be repaired according to any one of Examples 1-3, 5 or 6.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, or within 2% of the recited value.

Any headings that may be employed herein are also not intended to be used to construe the scope of the claims or to limit the scope of the subject matter that is disclosed herein.

Any use of the past tense to describe an example otherwise indicated or understood as constructive or prophetic is not intended to reflect that the constructive or prophetic example has actually been carried out.

Unless indicated otherwise, when a range of any type is disclosed or claimed, for example a range of weight percentages, processing times, and the like, it is intended that the stated range disclose or claim individually each possible number that such a range could reasonably encompass, including any sub-ranges and combinations of sub-ranges encompassed therein. For example, when describing a range of measurements such as weight percentages, every possible number that such a range could reasonably encompass can, for example, refer to values within the range with one significant digit more than is present in the end points of a range. In this example, a weight percentage between 10 percent and 20 percent includes individually 10, 11, 12, 13, 14, 15, 16, 17, 18, 19, and 20 weight percent. Applicant's intent is that these two methods of describing the range are interchangeable. Moreover, when a range of values is disclosed or claimed, which Applicants intent to reflect individually each possible number that such a range could reasonably encompass, Applicants also intend for the disclosure of a range to reflect, and be interchangeable with, disclosing any and all sub-ranges and combinations of sub-ranges encompassed therein. Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein.

The following numbered clauses are provided which describe aspects according to this disclosure, which state various attributes, features, and embodiments of the present invention both independently, or in any combination when the context allows. That is, as the context allows, any single numbered aspect and any combination of the following numbered aspects disclose the various attributes, features, and embodiments of the present disclosure.

1. A method for repairing a polymeric packaging material, comprising the steps of:
    a) providing a polymeric packaging material, an exterior surface of which is scratched or scuffed;
    b) adding at least one fluid into the polymeric packaging material to form a filled packaging material, wherein the filled packaging material is at least partially filled with the fluid; and
    c) applying at least one heat source to an exterior surface of the filled packaging material to form a repaired polymeric packaging material.

2. A method for repairing a polymeric packaging material, comprising the steps of:
    a) providing a polymeric packaging material, an exterior surface of which is scratched or scuffed;
    b) abrading the exterior surface of the polymeric packaging material;
    c) before or after the abrading step, adding at least one fluid into the polymeric packaging material to form a filled packaging material, wherein the filled packaging material is at least partially filled with the fluid; and
    d) applying at least one heat source to an exterior surface of the filled packaging material to form a repaired polymeric packaging material.

3. A method for repairing a polymeric packaging material, comprising the steps of:
    a) providing a polymeric packaging material, an exterior surface of which is scratched or scuffed; and b) applying at least one heat source to an exterior surface of the filled packaging material to form a repaired polymeric packaging material.

4. A method for repairing a polymeric packaging material, comprising the steps of:
  a) providing a polymeric packaging material, an exterior surface of which is scratched or scuffed;
  b) abrading the exterior surface of the polymeric packaging material; and
  c) applying at least one heat source to an exterior surface of the filled packaging material to form a repaired polymeric packaging material.

5. A method for repairing a polymeric packaging material, comprising the steps of:
  a) providing a polymeric packaging material, an exterior surface of which is scratched or scuffed; and
  b) abrading the exterior surface of the polymeric packaging material to form a repaired polymeric packaging material.

6. Any of the above methods, wherein the polymeric packaging material comprises high density polyethylene (HDPE), low density polyethylene (LDPE), linear low density polyethylene (LLDPE), polyethylene terephthalate (PET), poly(ethylene-co-furandicarboxylic acid) (PEF), polyvinyl chloride (PVC), polypropylene (PP), polystyrene (PS), polyamide (PA), acrylonitrile butadiene styrene (ABS), polycarbonate (PC), polyurethane (PU), melamine formaldehyde (MF), phenolics (PF), polyetherketones (PEEK), polylactic acids (PLA), polymethyl methacrylate (PMMA), polytetrafluoroethylene (PTFE), urea-formaldehyde (UF), post-consumer resins, bioplastics, or any combination thereof.

7. Any of the above methods, wherein the at least one heat source comprises a flame, a flame torch, convected hot air, a plasma arc, electromagnetic induction, infrared radiation, a laser, a maser, a short-pulse high intensity UV flash lamp, a hot tool, or combinations thereof, wherein the heat source is applied continuously or pulsed.

8. Any of the above methods, wherein the heat source comprises a Q-switched Nd:YAG laser or a UV (ultraviolet) excimer laser.

9. Any of the above methods, wherein the heat source comprises a UV (ultraviolet) excimer laser, having one or more of the following features:
  a) a laser wavelengths from about 150 to about 350 nm;
  b) a laser fluence from about 3 to about 300 mJ/cm² per pulse;
  c) a laser pulse width from about 10 ns to about 1,000,000 ns;
  d) a heat affected zone average temperature from about $T_m$ to about $T_m+100°$ C., where $T_m$ is the melt temperature of the polymeric packaging material; and/or
  e) a heat affected zone depth from about 5 nm to about 50,000 nm.

10. Any of the above methods, wherein the heat source comprises a UV (ultraviolet) excimer laser, having the following features:
  a) a laser wavelengths from 200 to 300 nm;
  b) a laser pulse width from about 100 ns to about 100,000 ns; and
  c) a heat affected zone average temperature from about $T_m$ to about $T_m+50°$ C., where $T_m$ is the melt temperature of the polymeric packaging material.

11. Any of the above methods, wherein the at least one fluid comprises water, an alcohol, a polyol, brine, an acid solution, a base solution, a mineral oil, a vegetable oil, a synthetic oil, a petroleum jelly, a liquid paraffin, a solvents that does not degrade the polymeric packaging material, air, an inert gas, nitrogen, helium, argon, or any combination thereof.

12. Any of the above methods, wherein the at least one fluid comprises water.

13. Any of the above methods, wherein the polymeric packaging material comprises a refillable PET, PEF, PC, or PP bottle or container.

14. Any of the above methods, wherein the step of applying at least one heat source to the exterior surface comprises softening, deformation, and/or melting of the surface.

15. Any of the above methods, wherein abrading comprises sanding, stoning, particulate blasting, peening, filing, grinding, or combinations thereof.

16. An apparatus for recycling a polymeric packaging material comprising:
  a) at least one fluid source for providing at least one fluid for dispensing into the polymeric packaging material to form a filled packaging material; and
  b) at least one heat source configured to heat an exterior surface of the filled packaging material.

17. An apparatus for recycling a polymeric packaging material comprising:
  a) an abrasive component for contacting an exterior surface of the polymeric packaging material with an abrasive material;
  b) at least one fluid source for providing at least one fluid for dispensing into the polymeric packaging material to form a filled packaging material; and
  c) at least one heat source configured to heat an exterior surface of the filled packaging material.

18. An apparatus for recycling a polymeric packaging material comprising at least one heat source configured to heat an exterior surface of the filled packaging material.

19. An apparatus for recycling a polymeric packaging material comprising:
  a) an abrasive component for contacting an exterior surface of the polymeric packaging material with an abrasive material; and
  b) at least one heat source configured to heat an exterior surface of the filled packaging material.

20. Apparatus for recycling a polymeric packaging material as disclosed herein, the apparatus comprising one or both of an abrasive component and/or a heat source for refurbishing the exterior surface of the polymeric packaging material.

We claim:
1. A method for repairing a polymeric container, comprising the steps of:
  a) providing a polymeric container comprising a polymeric packaging material, an exterior surface of which is scratched or scuffed;
  b) adding at least one fluid into the polymeric container to form a filled container, wherein the filled container is at least partially filled with the fluid; and
  c) applying heat from at least one heat source to an exterior surface of the filled container to form a repaired polymeric container,
  wherein the at least one heat source comprises a flame, a flame torch, convected hot air, a plasma arc, electromagnetic induction, infrared radiation, a laser, a maser, a short-pulse high intensity UV flash lamp, a hot tool, or combinations thereof, wherein the heat source is applied continuously or pulsed, wherein the exterior surface of the filled container reaches a temperature T, wherein $T_m<T<T_m+100°$ C., where $T_m$ is a peak melt temperature of the polymeric packaging material; and wherein the polymeric container comprises polyethylene terephthalate (PET), poly(ethylene-co-furandicarboxylic acid) (PEF), polypropylene (PP), polycarbonate (PC), or any combination thereof.

2. The method of claim 1, wherein the heat source comprises a Q-switched Nd:YAG laser or a UV (ultraviolet) excimer laser.

3. The method of claim 1, wherein the heat source comprises a UV (ultraviolet) excimer laser, having one or more of the following features:
   a) a laser wavelengths from about 150 to about 350 nm;
   b) a laser fluence from about 3 to about 300 mJ/cm² per pulse;
   c) a laser pulse width from about 10 ns to about 1,000,000 ns;
   d) a heat affected zone average temperature from about $T_m+10°$ C. to about $T_m+70°$ C.; and/or
   e) a heat affected zone depth from about 5 nm to about 50,000 nm.

4. The method of claim 1, wherein the heat source comprises a UV (ultraviolet) excimer laser, having the following features:
   a) a laser wavelengths from 200 to 300 nm;
   b) a laser pulse width from about 100 ns to about 100,000 ns; and
   c) a heat affected zone average temperature from about $T_m+20°$ C. to about $T_m+50°$ C.

5. The method of claim 1, wherein the at least one fluid comprises water, an alcohol, a polyol, brine, an acid solution, a base solution, a mineral oil, a vegetable oil, a synthetic oil, a petroleum jelly, a liquid paraffin, a solvent that does not degrade the polymeric container, air, an inert gas, nitrogen, helium, argon, or any combination thereof.

6. The method of claim 1, wherein the polymeric container comprises a refillable PET, PEF, PC, or PP bottle or container.

7. The method of claim 1, wherein the step of applying heat from at least one heat source to the exterior surface comprises softening, deformation, and/or melting of the surface.

8. The method of claim 1, wherein $T_m+40°$ C.$<T<T_m+80°$ C.

9. The method of claim 1, wherein the polymeric container comprises polyethylene terephthalate (PET) or poly(ethylene-co-furandicarboxylic acid) (PEF), or a combination thereof.

10. A method for repairing a polymeric container, comprising the steps of:
    a) providing a polymeric container comprising a polymeric packaging material, an exterior surface of which is scratched or scuffed;
    b) abrading the exterior surface of the polymeric container;
    c) adding at least one fluid into the polymeric container to form a filled container, wherein the filled container is at least partially filled with the fluid, or applying at least one fluid onto the exterior surface of the polymeric container; and
    d) applying heat from at least one heat source to an exterior surface of the filled container to form a repaired polymeric container, wherein the at least one heat source comprises a flame, a flame torch, convected hot air, a plasma arc, electromagnetic induction, infrared radiation, a laser, a maser, a short-pulse high intensity UV flash lamp, a hot tool, or combinations thereof, wherein the heat source is applied continuously or pulsed, wherein the exterior surface of the filled container reaches a temperature T, wherein $T_m<T<T_m+100°$ C., where $T_m$ is a peak melt temperature of the polymeric packaging material; and wherein the polymeric container comprises polyethylene terephthalate (PET), poly(ethylene-co-furandicarboxylic acid) (PEF), polypropylene (PP), polycarbonate (PC), or any combination thereof.

11. The method of claim 10, wherein abrading comprises sanding, stoning, particulate blasting, peening, filing, grinding, or combinations thereof.

12. The method of claim 10, wherein the heat source comprises a Q-switched Nd:YAG laser or a UV (ultraviolet) excimer laser.

13. The method of claim 10, wherein the heat source comprises a UV (ultraviolet) excimer laser, having one or more of the following features:
    a) a laser wavelengths from about 150 to about 350 nm;
    b) a laser fluence from about 3 to about 300 mJ/cm² per pulse;
    c) a laser pulse width from about 10 ns to about 1,000,000 ns;
    d) a heat affected zone average temperature from about $T_m+10°$ C. to about $T_m+70°$ C.; and/or
    e) a heat affected zone depth from about 5 nm to about 50,000 nm.

14. The method of claim 10, wherein the heat source comprises a UV (ultraviolet) excimer laser, having the following features:
    a) a laser wavelengths from 200 to 300 nm;
    b) a laser pulse width from about 100 ns to about 100,000 ns; and
    c) a heat affected zone average temperature from about $T_m+20°$ C. to about $T_m+50°$ C.

15. The method of claim 10, wherein the polymeric container comprises a refillable PET, PEF, PC, or PP bottle or container.

16. The method of claim 10, wherein $T_m+40°$ C.$<T<T_m+80°$ C.

17. The method of claim 10, wherein the polymeric container comprises polyethylene terephthalate (PET) or poly(ethylene-co-furandicarboxylic acid) (PEF), or a combination thereof.

* * * * *